US012810350B2

(12) United States Patent
Iddon

(10) Patent No.: US 12,810,350 B2
(45) Date of Patent: Nov. 24, 2026

(54) SYSTEMS AND METHODS FOR THE DISPLAY OF VIRTUAL CLOTHING

(71) Applicant: Retail Social Limited, Weybridge (GB)

(72) Inventor: Simon William Iddon, Weybridge (GB)

(73) Assignee: Retail Social Limited (GB)

( * ) Notice: Subject to any disclaimer, the term of this patent is extended or adjusted under 35 U.S.C. 154(b) by 3 days.

(21) Appl. No.: 18/558,484

(22) PCT Filed: May 5, 2022

(86) PCT No.: PCT/GB2022/000057
§ 371 (c)(1),
(2) Date: Nov. 1, 2023

(87) PCT Pub. No.: WO2022/234240
PCT Pub. Date: Nov. 10, 2022

(65) Prior Publication Data

US 2024/0221062 A1 Jul. 4, 2024

(30) Foreign Application Priority Data

May 5, 2021 (GB) ..................................... 2106435
Jul. 19, 2021 (GB) ..................................... 2110359

(51) Int. Cl.
*G06Q 30/0601* (2023.01)
*G06T 13/40* (2011.01)

(52) U.S. Cl.
CPC . *G06Q 30/06431* (2025.08); *G06Q 30/06443* (2025.08); *G06Q 30/06444* (2025.08); *G06T 13/40* (2013.01)

(58) Field of Classification Search
CPC .... G06Q 30/0601–06444; G06T 13/20; G06T 13/40; G06T 15/005; G06T 15/04;
(Continued)

(56) References Cited

U.S. PATENT DOCUMENTS 11,308,687 B1 * 4/2022 Liang ...................... G06T 13/40
2003/0212605 A1 * 11/2003 Chin ................. G06Q 30/0635 705/26.81

(Continued)

FOREIGN PATENT DOCUMENTS

WO 2012110828 A1 8/2012
WO 2017004392 A1 1/2017

OTHER PUBLICATIONS

S. Hauswiesner, M. Straka and G. Reitmayr, "Virtual Try-On through Image-Based Rendering," in IEEE Transactions on Visualization and Computer Graphics, vol. 19, No. 9, pp. 1552-1565, Sep. 2013, doi: 10.1109/TVCG.2013.67 (Year: 2013).*

(Continued)

*Primary Examiner* — William J Allen
(74) *Attorney, Agent, or Firm* — Endurance Law Group PLC; James R. Yee

(57) ABSTRACT

Virtual clothing systems and methods are disclosed which comprise receiving a display request for displaying virtual clothing worn by a virtual body model. The request includes a reference to a set of clothing models. The system and method further comprises generating a set of animated composite models. Each animated composite model includes a body model, one of the referenced set of clothing models and a motion descriptor. In response to the display request, user interface data is transmitted to a user device. A user interface on the user device is configured by the user interface data to display renders of the animated composite models.

21 Claims, 6 Drawing Sheets

(58) Field of Classification Search
CPC ........... G06T 15/10–205; G06T 19/003; G06T 19/006; G06T 19/20; G06F 3/048–04897
See application file for complete search history.

(56) References Cited

U.S. PATENT DOCUMENTS

| | | | | |
|---|---|---|---|---|
| 2009/0079743 | A1* | 3/2009 | Pearson | G06T 13/20 345/473 |
| 2010/0299616 | A1* | 11/2010 | Chen | G06Q 30/0621 715/753 |
| 2014/0176565 | A1* | 6/2014 | Adeyoola | G06F 18/22 345/473 |
| 2016/0284017 | A1* | 9/2016 | Almog | G06T 7/60 |
| 2021/0405739 | A1* | 12/2021 | Bashkirov | G06F 3/0346 |
| 2022/0237841 | A1* | 7/2022 | Spencer | G06T 13/40 |

OTHER PUBLICATIONS

R. Li, K. Zou, X. Xu, Y. Li and Z. Li, “Research of Interactive 3D Virtual Fitting Room on Web Environment,” 2011 Fourth International Symposium on Computational Intelligence and Design, Hangzhou, 2011, pp. 32-35, doi: 10.1109/ISCID.2011.17. (Year: 2011).*

* cited by examiner

SYSTEMS AND METHODS FOR THE DISPLAY OF VIRTUAL CLOTHING

CROSS REFERENCE TO RELATED APPLICATIONS

This application claims priority to International Patent Application WO PCT/GB2022/000057 filed on May 5, 2022, which claims priority to GB 2106435.7, filed on May 5, 2021, and GB 2110359.3, filed on Jul. 19, 2021 the entire disclosures of which are hereby incorporated by reference and relied upon.

FIELD OF THE INVENTION

The present invention relates to systems and methods for the display of virtual clothing, in particular for the display of virtual clothing worn by dynamic virtual subjects for use in a computerised clothing retail environment. Consequently, the invention also relates to the viewing, selection and purchase of clothing depicted within such a virtual environment.

BACKGROUND TO THE INVENTION

Traditional clothing retail includes displays that allow shoppers to see how various items of clothing may appear—for example, via dressing mannequins with clothes. Moreover, shoppers are able to try on clothes for themselves within a dressing room to determine exactly how clothing will fit. Mirrors inside the dressing room allow the shopper see the appearance and fit for themselves, and friends or shopping assistants who are nearby can also provide feedback.

Naturally, this is not possible in a computerised clothing retail environment, and so there are significant challenges associated with providing shoppers with feedback about clothing fit and appearance. Clothing retailers, providing their products for purchase online, typically provide static images of clothes worn by typically unrepresentative fashion models, or clothes not worn by a subject. However, this does not provide a user of that computerised retail environment with accurate information about how those clothes are likely to appear and fit the user: every user will have an individual body size, shape and appearance. Accordingly, present online clothing retail solutions involve a user ordering more clothes than required for delivery, trying on those clothes, and returning those that are unsatisfactory. This is costly, and wasteful of time, resources and environment impact.

Moreover, existing online clothing retail experiences do not deliver on humans' need for choice and control, through engaging, dynamic and social interactions, unable to try-before-you-buy that exacerbates the returns, and present instead a relatively static, stale, tame and uninviting "me too" on-line shopping environment.

It is against this background that the present invention has been devised.

SUMMARY OF THE INVENTION

According to a first aspect of the present invention there may be provided a computer-implemented system. Preferably, the system is a clothing retail system for the display of virtual clothing worn by virtual body models. Preferably, the system comprises a virtual model server. The virtual model server may be configured to receive a display request for displaying on a user device virtual clothing worn by a virtual body model. The request may include a reference to a set of clothing models and/or a user session identifier that specifies the user device. Clothing can include accessories, footwear, apparel, and the like.

The virtual model server may be configured to generate a set of composite models comprising a body model and one of the referenced set of clothing models. Preferably, the virtual model server is configured to generate a set of animated composite models, each including: a body model, one of the referenced set of clothing models, and a motion descriptor. The clothing models may vary by retailer and/or brand.

The virtual model server may be configured to store the generated set of composite models or renders. Advantageously, this means they can be retrieved in response to a corresponding display request, and presented via the user device more quickly than if the composite models have to be generated first by the virtual model server on the fly, in response to a request.

The virtual model server may be configured to transmit to the user device specified by the user session identifier, in response to the display request, user interface data. The user interface data may configure a user interface on the user device to display renders of the animated composite models. Preferably, each render depicts a dynamic virtual subject defined by the body model, wearing a clothing model referenced by the request, and moving within a range of motion defined by the motion descriptor. The user interface may be configured to receive a switching user interaction to switch between different renders.

The user interface may be part of a web browser, a mobile application, or another similar program running on the user device or other device made available for the user to have access to the system.

Preferably, at least one body model will have more than one body characteristics that may be used to customise the choice of body model used within the inventions, preferably including height, clothing body size, skin tone, among other body characteristics.

Preferably, the set of animated composite models each comprise at least one of a common body model and a common motion descriptor.

Preferably, the generation of the set of animated composite models comprises performing a virtual fitting of clothes represented by set of clothing models, to a virtual subject defined by the body model.

Preferably, at least one of the body model and the set of clothing models comprise attributes that reflect real-world conditions and behaviour of those models, the attributes including at least one of: size, elasticity and natural looking movement.

Preferably, each render comprises a sequence of frames. At least one frame may be registered with the view and/or pose of the animated composite model. The user interface may be configured to receive the switching user interaction, and in response switch between renders at a position in their respective frame sequences that have substantial view and/or pose correlation, thereby minimising the visual discontinuity of switching.

Preferably, each render has the ability to be comprised of a 3D image using a 3D viewer that can move or rotate the render through different views or orientations.

Preferably, the system further comprises at least one retailer server. The retailer server may provide electronic retail services to end-customers, and thereby may be a customer-facing retail server. Preferably, the retailer server is configured to provide aspects of an electronic commerce retail environment. A set of clothes may be selected for viewing by users within the electronic commerce retail environment. The set of clothes may be selected via a respective user device. User selection of the set of clothes within the electronic commerce retail environment may control generation of the display request that is sent to the virtual model server, ideally with the reference to a set of clothing models corresponding to the set of user-selected clothes.

Preferably, the retail environment comprises a clothing ordering interface configured to receive a user order to purchase clothing associated with at least one of the set of clothes displayed. The clothing ordering interface may be configured to provide electronic clothing purchasing features, such as an "add to basket" feature in which selections are aggregated prior to the purchase of a set of clothes. Other expected retailer basket related features may be provided by the clothing ordering interface.

Preferably, the user interface of the user device comprises a model display region within which renders of virtual subjects are displayed. Preferably, the user interface of the user device comprises a control region via which a user can provide control inputs to the user interface, the control region comprising a user interface element for receiving the switching user interaction. Preferably, the model display region and the control region are displayable simultaneously by the user interface.

Preferably, receiving the switching user interaction comprises receiving at least one of: user command to change the style, fabric, colour and/or size of clothing to be displayed. Other similar parameters may be controlled by a corresponding user command.

Preferably, the body model that is used to generate the set of animated composite models is dependent on a respective user session identifier. The user session identifier can be used to maintain a consistent virtual clothing display session for a user regardless of whether a user is authenticated into a customised registered profile, or is browsing in "guest mode".

Preferably, the virtual model server comprises a plurality of registered user accounts (also called user profiles) each having a customised body model associated with it, access to a user profile being dependent on a user providing valid authentication and/or authorisation credentials. Preferably, where a user is not registered then a subset of capabilities can be used by a guest-type user and preferably this subset may exclude the ability to choose their own body model, and preferably instead use the retailers preferred body model, or otherwise a default model. Registered user profiles typically have appropriate terms, conditions, privacy policy and GDRP-like consents agreed with a user as part of their registration process.

Preferably, each user account has a unique user identifier associated with it, the unique user identifier being provided in communication with the virtual model server as part of a display request originating from a user authorised via access credentials, to access their user profile. The user session identifier may comprise a user identifier, or the user identifier may be provided in conjunction with the user session identifier. Access to a user profile enables the display of a body model chosen by the user instead of a default body model, and together with a user session identifier, can be used to display selected composite models or renders of the same.

Preferably, the user interface comprises a body customisation module via which the customised body model can be specified, the body customisation module comprising UI elements for selecting or adjusting the characteristics of the body model.

Preferably, the UI elements comprise at least one menu for selecting attributes of the body model, and for changing the values of those attributes.

Preferably, the body customisation module is configured to receive an image of a face, ideally of the user, and adapt the customised body model (and/or the customised composite model) so that its face matches that of the face image within the render. Advantageously, this allows a level of personalisation and preferably helps the animated body composite model 'look like' the user. The body customisation module may allow selection of a mannequin style face, or of a relatively featureless face as this may be preferable to certain users.

The virtual model server may be configured to generate an environment identifier which identifies a virtual environment, such as a virtual fitting room, within which is displayed at least one virtual subject that wears virtual clothing as selected by a user associated with that virtual environment. Thus, each user can have at least one of their own virtual environments, such as a virtual fitting room, which is referenced by a unique environment identifier.

Moreover, the virtual model server can associate the environment identifier with at least part of the display request for displaying virtual clothing worn by a virtual body model—as specified by a particular user. For example, the environment identifier may be associated with a corresponding user session identifier. The environment identifier may be associated with a body model, one of a referenced set of clothing models, and/or a motion descriptor. Accordingly, a user, a user device, and/or selections made by a user, can be associated with a virtual environment.

Preferably, the virtual model server stores the environment identifier and its associations, such as parameters or other, and these associations are updated in response to additional display requests. Thus, the environment identifier persistently references the most recent content of the virtual environment and, in particular, the appearance of a virtual subject within that environment. A user can thus conveniently retrieve a virtual subject that was previously specified. The selection of a virtual subject (e.g. customisation of a body model by a user) may be stored in a registered users profile that is then available for future exchanges between the user device and the virtual model server.

For example, during a first data exchange between the virtual model server and the user device, in response to receiving a display request, the virtual model server can generate the environment identifier, and transmit it to the user device. In a second or subsequent data exchange between the virtual model server and the user device, the virtual model server can receive an environment access request that includes the environment identifier. This can be initiated by the user device, and/or a retailer server on behalf of the user device.

Preferably, in response to receiving the environment access request, the virtual model server transmits, to a respective user device, user interface data configuring a user interface on the user device to display renders of animated composite models. Naturally, the composite models are those previously associated with the environment identifier, such as may have been previously defined and/or generated during the first data exchange. This allows the user to pick up where they left off. The virtual model server can do this by receiving the environment identifier (as part of the environment access request) instead of a display request, and so this removes the need for the user to respecify the body model, clothing model, motion descriptor, and/or other similar information. Accordingly, the virtual model server need not receive a display request to transmit user interface data to configure the user device to display renders of the animated composite models.

Naturally, such an environment access request may include authentication protocols to ensure access to a virtual environment, such as a virtual fitting room, is granted only to authorised users. For example, during a first data exchange, an authentication token is stored on the user device (e.g. within the local storage of a browser of the user device), or otherwise accessible to the user device (e.g. as part of a user profile). During a second data exchange, the authentication token is provided in combination with the environment identifier to grant the user device access to the virtual environment associated with the environment identifier.

The environment identifier also allows such a virtual environment to be shared as part of a shared display environment in which multiple users are granted access to view and/or control the same virtual environment. Moreover, multiple user access may have simultaneous access to the same virtual environment.

By way of example, each virtual environment will have a host user who typically through the retailer server initiated the virtual environment session. A host user may be an authenticated host user within the platform or be a guest host user who does not have a profile to which they are authenticated with.

Authenticated users are users of the system who have created a profile for which terms, conditions and privacy policy would usually be accepted, and may have made changes to their profile such as providing various consents to allow use of certain features of the system, for example being able to share access to their virtual environment to others, or using their profile face image within renders. The user interface has the ability to know if a user of a virtual environment is an authenticated user, for example an arbitrary hashed authorisation token can be stored within their browser local storage to which the presence or absence is checked by each virtual environment, and such token used to identify a user and their authentication status within the virtual model server to determine is the user is an authenticated or guest user, or biometric authentication using the user device linked to the same, such as face authentication. Consequently, authenticated users may have more features of the system available for them to use.

An authenticated consented host user virtual environment may have one or more visitor participant users accessing the same virtual environment whose control is determined by the authorisation granted to such users, which can be different for authenticated and non-authenticate or guest users. Multiple users will include a host user of a host user device to which a display request refers, and at least one participant user of a participant user device.

Accordingly, a user may be a host, who may be an authenticated consented host, or guest host who does not have a profile or is not authenticated with their profile, and an authenticated consented host may invite one or more visitor participant users to their virtual environment (such as their virtual fitting room), each of whom may be guest user visitor (with no profile or not authenticated for the same), or authenticated user visitor, each with their own authorisation to access certain features within their user interface on their user devices. These four core user modes usually define the authorisation permissions of different users within the system, however the system is capable of supporting more than four different user modes each with different permissions (e.g. retailer fashion consultant who may have more similar permissions to a host in being able to change selections of clothing).

In such an example, the virtual model server is configured to receive, from the participant user device, a request to access a virtual environment (e.g. a virtual fitting room), the request including a reference to the environment identifier. In response, the virtual model server is configured to transmit user interface data to the participant user device, with the user interface data configuring a user interface on the participant user device to display renders depicting a dynamic virtual subject, as defined by a composite model associated with the environment identifier, and as referenced by the original host user display request.

When an authenticated consented host user allows access for other visitor participant users to their virtual environment, the access may be provided in different ways and to different types of users providing differentiated levels of virtual environment access, authorisation and capability. For example, the host user may allow public access to their virtual environment to all and any users, to both authenticated visitor users and guest visitor users. The host may allow access to their virtual environment only for authenticated visitor users of the system (not to users who do not have a profile or are not authenticated). Also, the host may allow private access only to users they nominate for that virtual environment session such as selecting one or more users or a group of users for example 'best friends'.

Access for visitor users could be through a public URL that may be shared to others through various social messaging services, or similar, or through selecting users or groups within the system then sharing within the system and possibly also supporting push notifications for the same.

All access, for different types of users, may be up to a respective maximum number of concurrent users as defined for the host user. Access attempts from potential guest users to a virtual environment may be authorised according to such different ways and such guest users either denied access to the shared virtual environment, or approved access to the shared virtual environment to then be provided with access and capability as defined within the user mode authorisations.

Additionally, different users may be granted different permissions for viewing and/or control of different aspects of the shared environment. A host user device may define some permissions of other user devices to view or control a virtual environment invoked and associated with that host user. In particular, the host user device and/or the virtual model server may provide the environment identifier to a participant user device, optionally this may be provided with a participant authorisation token to grant a participant device with a specific level of access to the virtual environment associated with the environment identifier. Other permissions may be defined elsewhere within the system or according to their user mode. The level of access may grant the participant user at least one of:

- viewing the virtual environment;
- viewing the composite model selected by the host user (or other permitted user);
- changing the view or position of the composite model;
- adding virtual subjects to the virtual environment;
- controlling clothing worn by one or more virtual subjects within the virtual environment, by selection of clothing models;

controlling the underlying appearance of one or more virtual subjects within the virtual environment, by selection or modification of body models;

controlling the movement of one or more virtual subjects within the virtual environment, by selection of a motion descriptor;

adding items to their own basket corresponding to the items shown on the composite model typically in their own body model size;

receiving messages sent by other users of the virtual environment;

sending messages to other users of the virtual environment; and leaving the virtual environment, for example exiting the virtual fitting room.

It should be noted that an authentication token need not necessarily be essential to allow participant device to access a virtual environment if the host user device specifies that the virtual environment is made public.

Accordingly, multiple user devices can access a shared display environment. This is typically initiated by a host user device transmitting a sharing request to share the virtual environment with at least one other user device and their associated user.

Thus, in general, the system may comprise a shared display environment in which the virtual model server receives and/or processes a sharing request and in response transmits at least part of the user interface data to at least one other user device to enable display of renders of the same typically animated composite model on at least two user devices simultaneously. Preferably, the shared display environment is configured to receive a control input from a host user and their host user device, or other users with relevant permissions excluding users without the necessary permissions, and in response change the render displayed by those at least two user devices.

Preferably these additional users may support a different subset of features in how such composite model may be viewed and manipulated on their device.

Preferably, the shared display environment is configured with a messaging interface via which messages can be transmitted between the at least two user devices.

Preferably, the messages are displayed together with renders. Preferably each user may control how such messages and renders are displayed on their devices.

Preferably, the user interface of the user device is configured to display multiple renders simultaneously.

Preferably, the multiple renders are displayed simultaneously as part of the shared display environment.

Preferably, a user interaction or retailer's choice will request which clothes to show, and preferably the display session that is returned to the user device (such as a virtual fitting room) will be aware of the user identity (through authentication token in local browser storage or similar) which in turn may be used to ascertain if the user is authenticated, and if they have selected their own body model, otherwise a default body model for that retailer will be used.

Preferably, the retailer has no knowledge or information of user details, and such user profile details are not shared with the retailer, beyond providing more-customised images for display at the choice of the user, and that may help the user make more informed decisions on clothing purchases.

According to a second aspect of the present invention there is provided a virtual clothing display method, comprising at least one of:

receiving a display request for displaying virtual clothing worn by a virtual body model, the request including a reference to a clothing model or preferably a set of clothing models;

generating a set of animated composite models, each including:

a body model;

one of the referenced set of clothing models; and a motion descriptor; and transmitting in response to the display request, user interface data configuring a user interface on a user device to:

display renders of the animated composite models, each render depicting a dynamic virtual subject defined by the body model, wearing a clothing model referenced by the request, and moving within a range of motion defined by the motion descriptor; and receive a user interaction via the user interface to switch between each render.

According to a third aspect of the present invention there is provided at least one computer program comprising instructions which, when executed on at least one of a virtual model server, a retailer server, and a user device, configures the at least one virtual model server, retailer server, and user device to perform a virtual clothing display operation comprising:

receiving a display request for displaying virtual clothing worn by a virtual body model, the request including a reference to a set of clothing models generating a set of animated composite models, each including:

a body model;

one of the referenced set of clothing models; and a motion descriptor;

transmitting in response to the display request, user interface data configuring a user interface on a user device to:

display renders of the animated composite models, each render depicting a dynamic virtual subject defined by the body model, wearing a clothing model referenced by the request, and moving within a range of motion defined by the motion descriptor; and receive a user interaction via the user interface to switch between different renders.

It will be understood that features and advantages of different aspects of the present invention may be combined or substituted with one another where context allows.

For example, the features of the system described in relation to the first aspect of the present invention may be provided as part of the method described in relation to the second aspect of the present invention, and/or the computer program(s) of the third aspect and vice-versa.

Furthermore, such features may themselves constitute further aspects of the present invention, either alone or in combination with others.

For example, the features of the generation of animated composite models may themselves constitute further aspects of the present invention.

BRIEF DESCRIPTION OF THE SEVERAL VIEWS OF THE DRAWINGS

In order for the invention to be more readily understood, embodiments of the invention will now be described, by way of example only, with reference to the accompanying drawings in which.

SPECIFIC DESCRIPTION OF THE PREFERRED EMBODIMENTS

Figure 1:
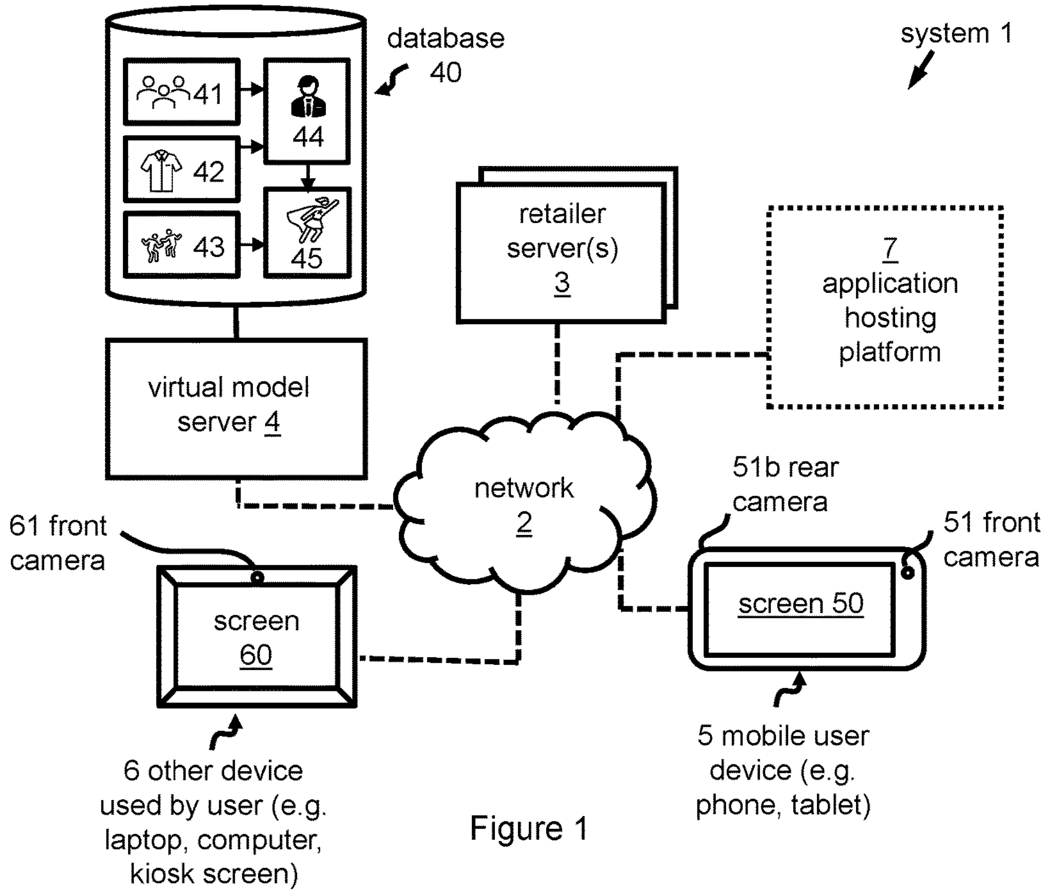
FIG. 1 shows a schematic overview of a system for the display of virtual clothing according to various embodiments of the present invention.

FIG. 1 is a schematic diagram of a system 1 for the display of virtual clothing. The system 1 comprises a network 2, at least one retailer server 3, a virtual model server 4, and at least one user device 5, 6 exemplified in FIG. 1 as a smartphone (i.e. the mobile user device 5) or a tablet user device 6. User devices may come in various forms, such as kiosks, laptops, smart TVs or similar.

It should be noted that every component shown in and described with reference to FIG. 1 is not necessarily an essential part of embodiments of the invention—they are merely included for completeness. Notably, some of the components may be simply used by or interact with the system 1 rather than necessarily being integral parts of the system 1 itself. For example, an application hosting platform 7, which is shown in dotted outline in FIG. 1, is considered to be a component that supports and interacts with the system 1.

Figure 2:
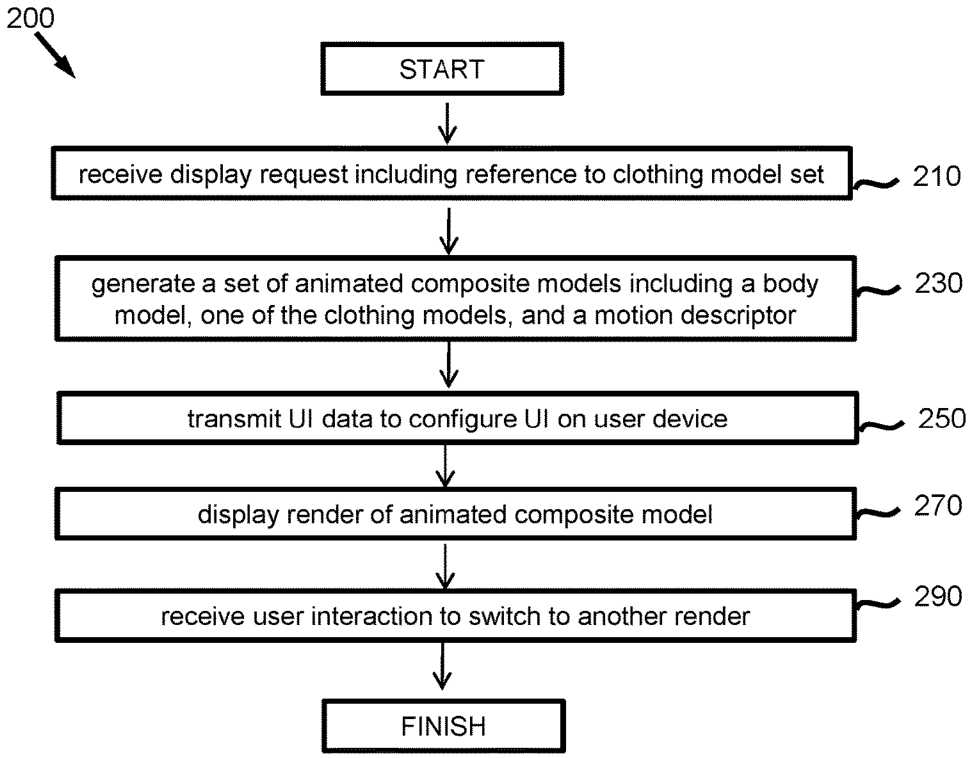
FIG. 2 is a flow diagram of a general virtual clothing display method according to various embodiments of the present invention, the method being suitable for use, in particular, for execution by the system of FIG. 1.

In general, the system 1 is configured to perform a virtual clothing display method 200 a generalised overview of which is described in relation to FIG. 2.

FIG. 2 is a high level flow diagram of a general virtual clothing display method 200 according to various embodiments of the present invention, including the embodiment of FIG. 1.

In a first step 210, the method comprises receiving a display request, typically at the virtual model server 4 for displaying virtual clothing worn by a virtual body model. The request includes a reference to a set of clothing models 42, and the request is typically initiated by one of the user devices 5, 6 which may be directly or through a connection to a retailer server 3. Indeed the virtual environment may be delivered as a modal overlay window or similar within the retailer server environment so the user does not appear to leave the brand retailer server while using the system. The request may be routed or established via a retailer server 3.

In a second step 230, the method comprises generating a set of animated composite models, each including a body model, one of the referenced set of clothing models, and a motion descriptor. Again, this generating step is typically performed at the virtual model server 4.

In a third step 250, the method comprises transmitting, in response to the display request, user interface data. This is typically transmitted from the virtual model server 4 to the user device that initiated the original display request, and is for controlling the behaviour of a user interface of that user device 5, 6. The response may be routed via a retailer server 3.

In a fourth step 270, the method comprises the user interface data configuring the user interface of the device to display a render of one of the animated composite models. Each render depicts a dynamic virtual subject defined by the body model, wearing a clothing model referenced by the request, and moving within a range of motion defined by the motion descriptor.

In a fifth step 290, the method comprises receiving a user interaction via the user interface to switch between each render.

Referring to FIG. 1, a more detailed description of the components and function of the system 1 will now be described.

Each user device 5, 6 has a respective screen 50, 60 via which the user device 5, 6 can provide a user with a user interface via which information can be displayed to the user, and the user can provide inputs to the systems. Examples of these user interfaces are shown in FIGS. 3 to 7.

Referring back to FIG. 1, the virtual model server 4 comprises a database 40 within which is stored body models 41 and clothing models 42 which are computerised 3D models of subjects and clothing respectively. These 3D models are renderable to generate 2D images of those subjects and clothing, which can be displayed on the 2D screens 50, 60 of user devices 5, 6. To this end, rendering comprises applying a skin (i.e. a surface image) to the 3D model corresponding to the size and shape, pattern, fabric, colour of a clothing model or the skin and appearance of a body model. As the 2D images are derived from 3D models, they have a three-dimensional appearance that is relatively realistic.

The body and clothing models 41, 42 are also manipulable to change their pose—i.e. the relative position of their component parts, such as the arms and legs of the virtual subject, and the sleeves of a garment worn by that virtual subject. This effectively shows such models moving in recognisable human like movements.

The 3D body and clothing models 41, 42 include attributes that reflect real-world conditions and behaviour and so allow for accurate virtual fitting of clothes represented by a clothing model, to a virtual subject defined by a body model. Such fitting also provides realistic looking movement and flow of clothing garments which move in recognisable garment-like movements.

For example, one attribute is size relative to a set of common references. This allows an accurate representation to be formed of whether an item of clothing that a particular clothing model represents, is likely to be too big or too small, short or long, for a subject represented by a particular body model. Another set of attributes relate to the elasticity of various parts of a body or clothing model. Accordingly, an accurate visual representation can be constructed of the relative deformation between a part of an item of clothing and a corresponding part of the body to which it is normally fitted. Accordingly, tight or loose fits can be depicted, and also the deformation of a simulated clothing fabric—for example, not simply stretching a fabric pattern for larger sized clothes, instead using more material with correct fabric sizes, the movement and swish of the material of the clothing, body and hair and similar, can also be modelled and displayed.

To this end, the virtual model server 4 is configured to generate a composite model 44 by calculating a combination of a body model 41 and a clothing model 42, thereby to virtually fit the clothing model 42 to the body model 41. Specifically, the generation of composite models 44 typically comprises comparing the attributes of the body and clothing models 41, 42 with one another to determine how a clothing model 41 will fit to a body model 42. Once generated, the virtual model server 4 stores the composite model 44 in the database 40. Accordingly, the system knows which different clothing models fit on which respective body models.

The database 40 also comprises motion descriptors 43 which provide a description of how a pose of a composite model 44 changes during a sequence. Accordingly, motion descriptors 43 can be applied to animate composite models 44, and when so applied can be used to generate an animated composite model 45 which can also be stored in the database 40. Thereafter, animated composite models 45 can be rendered to display an animated dynamic virtual subject. This presents a useful advantage over static models in that it is possible for a user to better understand how the appearance and fit of certain clothes to certain body sizes and shapes are in dynamic situations and while performing more human-like motions.

Motion descriptors 43 may be in the form of general motion descriptor 43 that can be applied to multiple composite models. Advantageously, this allows a single general motion descriptor 43 to specify the animation of multiple composite models 44. In other words, different rendered subjects, with different virtual clothes, can be displayed performing the same range of movements, as defined by a single general motion descriptor 43.

General motion descriptors 43 can be derived from motion capture techniques in which the motion of a real-life performer is monitored over time and translated into information that can be used to guide the movement of a corresponding 3D model. The application of these general motion descriptors 43 is typically achieved via skeletal animation which may be fed through motion capture wherein each body model 41, clothing model 42 and composite model 44 has a common underlying skeleton the movement of the parts of which are controlled by the motion descriptors 43.

Additionally, a set of specific motion descriptors may be unique to one or a group of body/clothing models. For example, a specific motion descriptor may be uniquely associated with a clothing model for a skirt, and defines how the loose fabric of that skirt flows when undertaking a particular motion.

In complement with this, body and clothing models 41, 42 may include a set of movement attributes that define the dynamic behaviour of parts of those models, especially when another linked part of the model is set in motion by a motion descriptor. For example, the dynamic behaviour of hair may be defined relative to the movement of the head of a body model to which that hair is rooted. Accordingly, dynamic behaviour of a virtual subject and clothing can be specified via a specific motion descriptor, or calculated in dependence on movement attributes of a body or clothing model 41, 42.

Accordingly an animated composite model 45 can be generated by the virtual model server 4. Furthermore, a dynamic render can be generated for display on screens 50, 60 of the user devices 5, 6, the render being a rendered form of the animated composite model 45.

Renders typically comprise a sequence of frames each depicting a rendered image of the composite model taken from a viewpoint. The sequence of frames capture how the pose of the composite model changes during a corresponding animated sequence specified by a motion descriptor.

In the present embodiment, each frame of a render is view and pose registered. This identifies, for each frame, the pose of the virtual subject and its position relative to the viewpoint of the frame. Advantageously, this allows different renders to be synchronised with one another, specifically so that it is possible to switch between the display of two different renders with minimal visual jarring. This can be achieved even if different composite models are used to generate the different renders.

For example, a first render may depict a woman wearing red clothing, and a second render may depict the same woman wearing green clothing, each performing a walking motion. The difference between the first and second renders may be as a result of applying a different coloured clothing model, for example.

As the sequence of frames advance, the virtual character in each render is depicted walking across the viewpoint—e.g. from right to left. A naive switch from the first to the second render, for example in response to a user request to view what different colour clothing would look like, would simply stop the first render mid-sequence, and start the second render at the start of its sequence. This would reset the position of the virtual character on screen, leading to a visual discontinuity during switching.

The use of view and pose registered frames allows mid-frame switching between renders that minimises visual discontinuity. This is achieved by determining a match or close correlation between the view and pose of a current frame being displayed as part of a first render, and the corresponding frame (i.e. position) of the second render to be switched to. At point of switching, the frame of the second render that is displayed is that which is next, after the frame identified by the match. Accordingly, the displayed movement of the virtual character appears near-continuous and uninterrupted. Thus, in this example, the clothing would appear to change from red to green during the uninterrupted walking motion of the character.

This advantage is retained, even when switching between renders derived from different body models and when switching between different clothing styles e.g. short dress to long dress retaining the same motion and effective continuity despite being different clothing. Triggering a switch between such renders at a junction where frames are view-and-pose correlated reduces the visual discontinuity of switching. This can be done following the receipt of such new renders from the virtual model server 4, or already cached on the user device 5 and 6 from prior viewing of such renders.

In alternatives, not every frame of a render may be pose or view registered. It may be possible to register only frames from which a transition is appropriate.

In the present embodiment, renders are typically generated by the virtual model server 4, and then transmitted to a user device 5, 6 for display. This has the advantage of the user device not requiring specialist rendering functionality, capability or processing resources, device memory storage for the render, or higher bandwidth speed and capacity requirements that although available in some territories, are not commonplace for most users, and also enables rendering to be performed by the virtual model server 4, reducing the delay in the display of virtual subjects. Rendering can be performed by the virtual model server 4 in advance, or rendering can be performed dynamically in near-real time or real time, and when performance allows, on demand. A more automated process using APIs between various systems would take the user selections of customised or default body model, optional face image, clothing model in style and colour, and motion descriptor, and have the render built through a pipeline process that takes these parameters through an API that creates e.g. the 3D animated composite model on-the-fly typically in layers. Renders may use the clothing models ability to remove underlying body model areas that are not seen through the clothing to reduce size and time, including any changes such as e.g. to the colour, re-rendering that aspect, or re-processing the colour layer that is applied to other previously rendered layers. In todays embodiment, the processing power and cost, the device bandwidth and memory storage are not commonly seen as performant enough, but such process can still be used to create the renders held on the virtual model server.

However, in alternatives, the user device 5, 6 may be provided with an animated composite model 45 and generate renders from it itself. This may involve applying a different skin to the regions of the animated composite model 45 that correspond to the clothing model, for example. Accordingly, the colour and texture of the fabric of the clothes worn by the virtual model can be easily changed.

In either case, the virtual model server 4 transmits user interface data, which comprises renders, or means for generating renders, or layers (e.g. colour) to augment existing renders, to a user device 5, 6 which may be directly or via a retailer server 3.

Each user device 5, 6 comprises a user interface that controls the respective screen 50, 60 of the device to display information such as renders on that display 50, 60. Thus, when a user device receives the user interface data from the virtual model server 4, it is able to display the render contained within, or derived from, the user interface data and make available certain functionality for the user typically defined by their user mode permissions.

The user interface also receives user interactions to allow the user to control the operation of the user device. In the present embodiment, the screen of each user device is a touch sensitive screen via which touch interactions such as various swipe gestures and drags can be received.

Other methods of controlling the user device are possible. For example, the device may be controlled in response to location, as determined by radio localisation devices such as Bluetooth® beacons, GPS in conjunction with geofences, etc. The change in location can be used to drive a change in the clothing model, for example. A set of clothing models relating to sportswear could be displayed if a mobile device is detected to be within a sportswear section of a shop, for example. Similarly, when a user device is located within a geofence related to a retailers physical location, the user device (typically using a mobile app that supports push notifications and GPS) can be sent a (consented) push notification not only alerting of the nearby presence, but can in parallel review the users browsing history with that retailer which is held in the profile history of the user within the system, then API interface to the retailer server for a near real-time inventory check at that location, then provide an informed message to the user such as that a recently browsed item online is physically available in store with suitable messaging through push notification or similar to that effect for the user.

A device such as retailer's display screen can switch the body model and/or animated composite model being displayed in response to detecting a signal (for example, containing a user identifier, as received from a personal electronic item) that causes the body model to be better matched to a user associated with that user identifier. The personal electronic item or user device may transmit the user identifier in response to detecting proximity to the location of a retailer's display screen, this may be received by the proximity server feature within the system that determines the action taken for such events, in a similar way for a shared fitting room transition using websockets, the display screen can be notified of a (maybe temporary) change in render related to an (consented) updated body model of the nearby user. After a period of time, or after a period of time of loss of such presence, then the display may revert back to the default selection of models in the renders on the display screen.

The user interface can be provided via a web browser and served to the user device when visiting a suitable web page. Alternatively, or in combination, a dedicated application or "app" can be downloaded from the application hosting platform 7 via the network 2 to the user device to confer it with the appropriate functionality.

Figure 3:
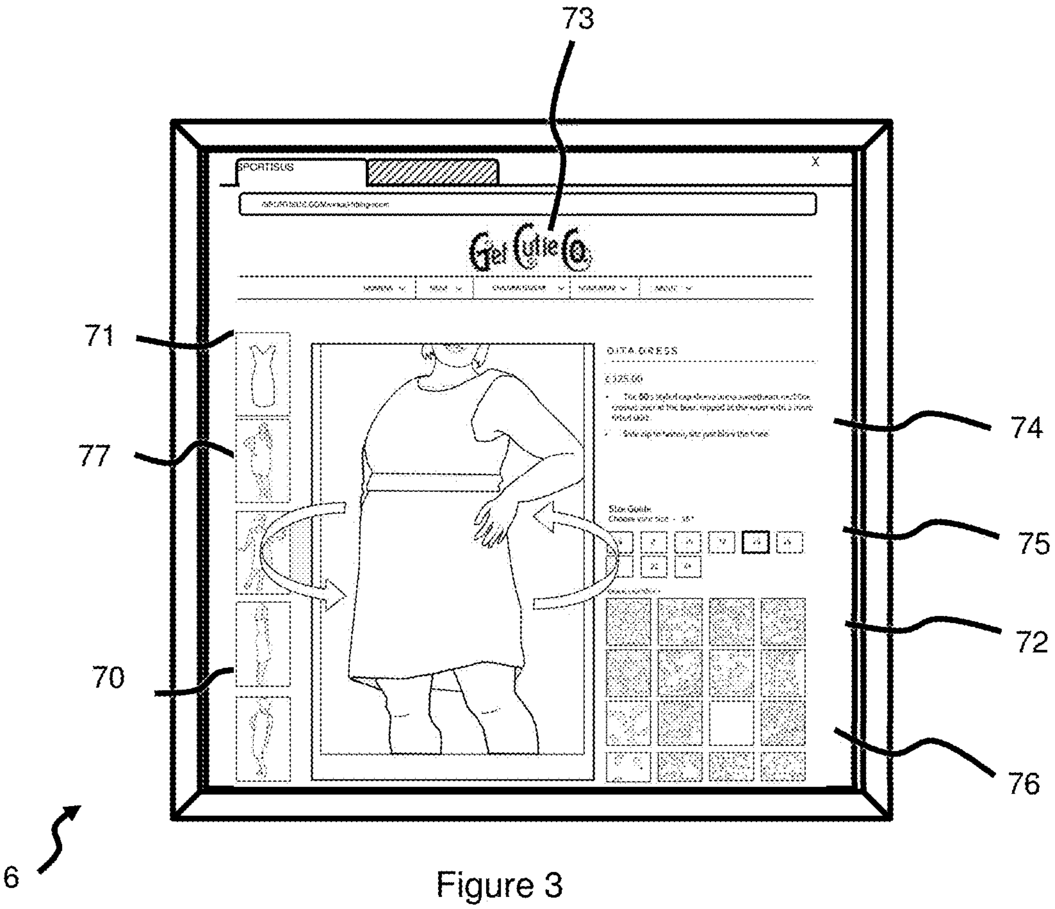
FIGS. 3 to 7 show example user devices of the system of FIG. 1, the user devices displaying virtual models and clothing, via a user interface of the respective user device.

FIG. 3 shows an example of a user interface 70 displayed on screen 60 of a tablet device 6, and provided via a web browser, and FIGS. 4 to 7 show an example of a corresponding user interface 70 displayed on the screen 50 of a mobile device 5, the user interface 70 being provided by an app.

In either case, the means of receiving user interface data typically involves at least one retailer server. A retailer server serves, via an app or web page, an electronic commerce retail environment via which clothing can be selected by user for viewing and various stages of an online retail customer user journey such as add to basket or purchase, and subsequent delivery to that user typically using the retailer. To this end, the user interface is configured to receive inputs from a user to filter a selection of clothing available via the retail environment, and so allows the user to browse or search for a particular style or range of clothing, for example.

Typically a user will initiate a call to action on the retailer server that causes the retailer server to initiate a virtual environment (e.g. virtual fitting room) to display such item. The retailer will typically request the clothing style and colour or fabric within the display request. The virtual environment is typically provided as a modal overlay within the retailers server. The virtual environment typically running in the user device browser looks for a user authentication token typically within the local storage of the browser as previously described. This results in the virtual environment being requested to use a customised body model within the render (or one of retailers default models) which is wearing the retailers requested clothes model, and users requested motion descriptor (or default motion descriptor). The authentication token is only seen and used by the system, not by the retailer, and provides for a further level of data privacy.

An electronic keyboard may be displayed within the control region to receive keywords for searching and/or a hierarchical list of options may be presented.

An add-to-basket UI element 83 allows clothing items that are currently displayed by the rendered virtual subject, selectable in alternative size and quantity, with other product details, to be added to a typical e-commerce shopping basket for later purchase and delivery. In particular, selection of the add-to-basket UI element 83 instantiates an add to basket functionality to the retailer core basket where the retailer maintains control of the overall user basket, or may initiate a clothing ordering interface for the ordering and subsequent option to purchase of respective clothing items.

In the present embodiment, the retailer server 3 provides or populates at least a part of the user interface 70 that is displayed on a user device 5, 6, and moreover can act as an intermediary between the user devices 5, 6 and the virtual model server 4—for example, routing user interface data from the virtual model server 4 to the appropriate user device 5, 6. Effectively, a user typically interacts with a retailer server, and uses the retailer server ecommerce capabilities, with the virtual model server 4 providing dynamic, interactive, hyper-personalised and socially shareable content instead of typically static un-engaging content which may be worn by a model, and if so, is likely not representative of the user.

In particular, the user interface 70 provided to a user device 5, 6 comprises a model display region 71 within which renders of virtual subjects are displayed, and at least one control region 72, 77, 76, via which a user can provide control inputs to the user interface, for example to navigate options provided by a clothing retail environment, and to switch between renders that represent different models and/or clothing options.

Figure 4:
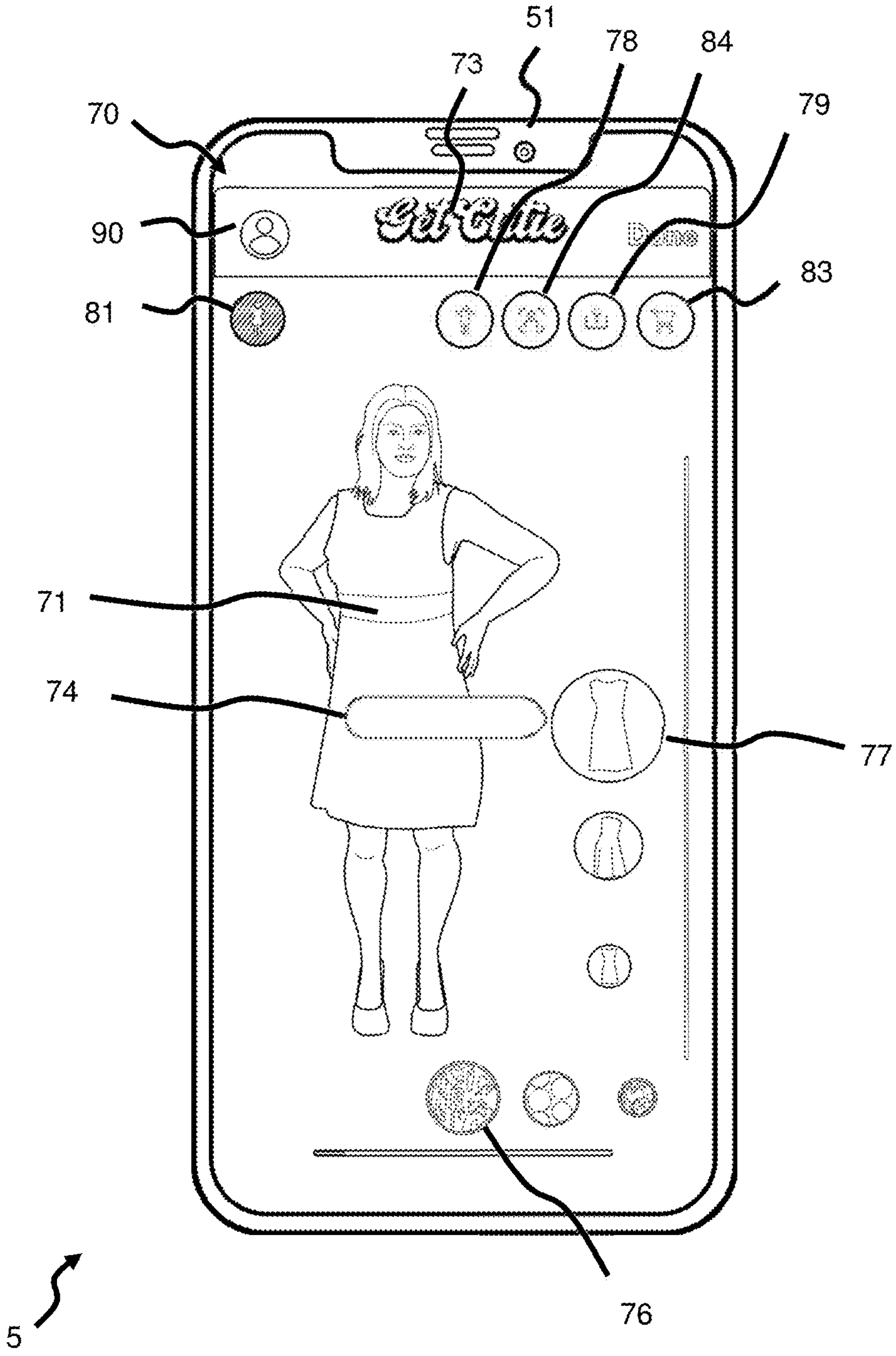
Figure 5:
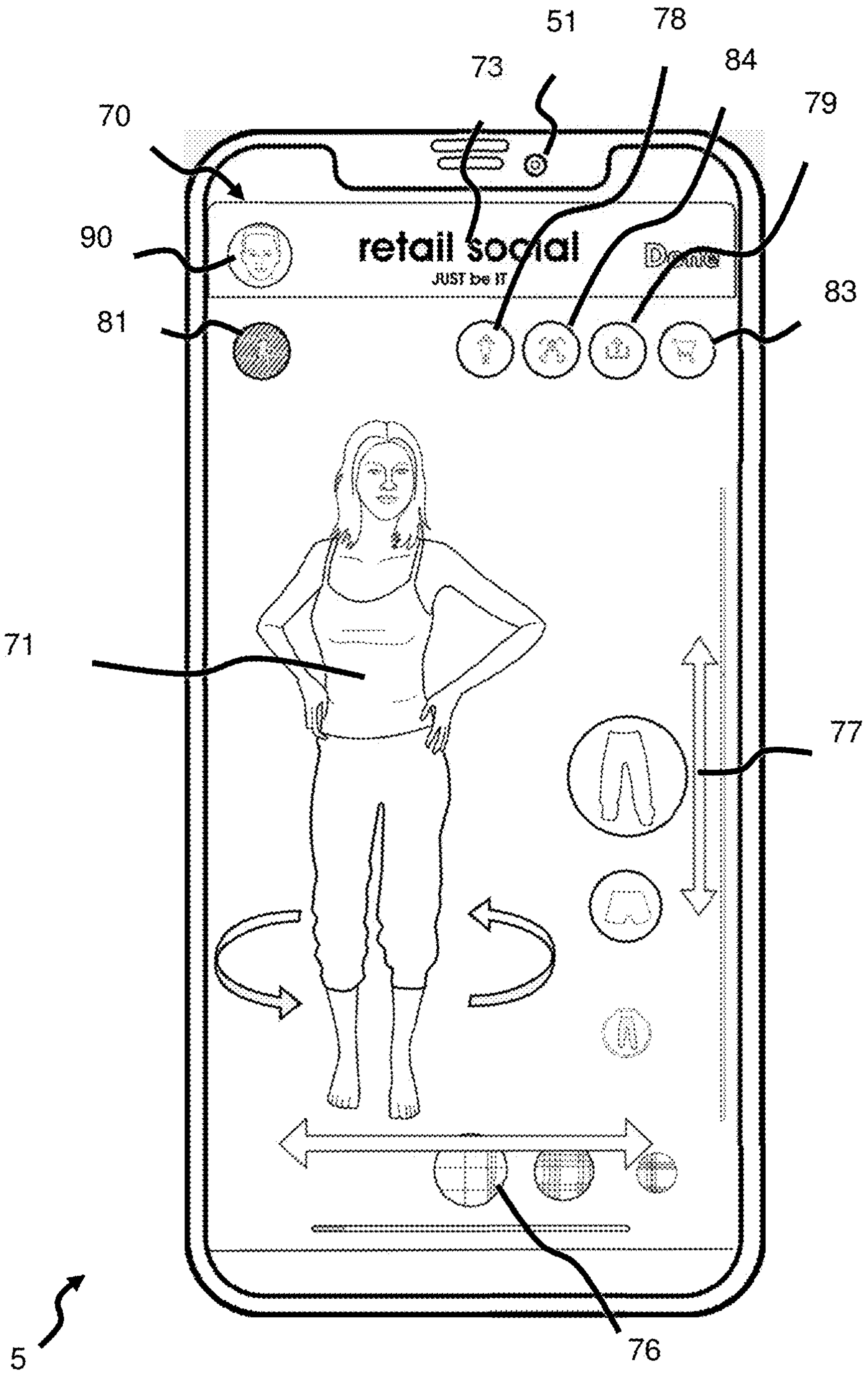

The control region 72 generally surrounds or otherwise is peripherally located to the model display region 71 so as not to interfere with the viewing of renders. The mobile user device 5 shown in FIGS. 4 and 5 provides UI elements of the control region 72 superimposed on the model display region 71, at least in part, so that the utilisation of the relatively limited screen area of a mobile device 5 is maximised. If a larger screen 60 is used, this provides a wider area for viewing the model display region 71.

Other contextual information may also be provided, for example a title or logo 73 that represents the retailer from which the clothing items can be purchased, and descriptions of the clothing such as in 74.

In FIG. 3, using a more traditional looking web control interface, the control region 72 of the user interface 70 provides various UI elements, for example size selection UI elements 75, fabric selection UI elements 76, and clothing selection UI elements 77, configured to receive a user selection of a preferred size, fabric and style of clothing respectively.

These selections drive the changing of the appearance of the virtual subject displayed by the user interface 70. Accordingly, the user may select or specify an item or set of clothing via the user interface 70 and, in response, each item of the set of clothing can be depicted via the user interface as worn by a virtual subject.

Specifically, the selection by a user (whether a customer, brand/independent fashion consultant and/or other users accessing another users virtual environment session) of a set of clothing (such as selection of a particular style, colour/fabric, garment size, length), generates a real-time request that includes a reference, or set of references to a corresponding set of clothing models on the virtual model server 4. The selection can be made by using the relevant UI elements 76, 77, or otherwise providing gesture (on touch screens), mouse (such as on non-touch screen laptops) or other inputs (such as gyro sensor within the user device that may provide gyro rotation data that can be used to effect a turn or transition in the model, alongside or in lieu of touch screen gestures).

The request may be generated in response to user clothing selections. The virtual model server 4 determines the appropriate combination of body model 41 and clothing model 42 needed to generate a composite model 44 as described before, which is then animated using a motion descriptor 43. Thereafter, user interface data is generated that configures the user interface of a user device 5, 6 to display a render of the animated composite model—corresponding to one of the set of clothing models which may be chosen by the user or the retailer. At the same time other renders, relating to other clothing models of the set, are typically made available to the user device (e.g. can be downloaded from the virtual model server 4). Accordingly, this can facilitate quick switching between renders, for example when the user interface of the user device receives a switching user interaction. Thus, in certain embodiments, the user can have the feel of gesturing through clothing items and colours in near real-time using locally cached content, also sized accordingly for mobile data users.

In certain embodiments, the user interface can receive a user interaction to choose a particular motion descriptor 43. For example, users may choose at least one of a number of available motion descriptors 43. Users can create and upload their own motion descriptors in supported formats, typically industry standard format such as FBX, that allow the animated composite model 45 to move in a customisable way. Customised or personal motion descriptors may be stored within a registered user account. User may be able to purchase motion descriptors 43 from a marketplace.

Additionally, as shown schematically in FIG. 5 by the rotation arrows adjacent to the virtual subject, the user interface 70 of a user device 5 can receive an interaction to cause the motion of the virtual subject to be modified. For example, a sideways drag across the virtual subject can cause it to move or rotate, which may be a forward or rewind action through a video file typically depicting human-like and may be retailer-specific movements (such as sporty motions for sportswear brands, and the like), or orientation of a 3D render within a 3D viewer or similar. This can be achieved via transmitting, within the request sent to the virtual model server, motion commands. In response, the virtual model server 4 can combine the appropriate composite model 44 with the appropriate motion descriptor 43 to generate the animated composite model 45 for use in generating a virtual subject able to enact the requested motion.

Alternatively, in the case where the user device 5, 6 performs rendering, the user device 5, 6 selects or generates the appropriate animated composite model 45 in response to receiving the motion command, and displays the resulting render. The user interface 70 also includes an animation control UI element 81 which, when toggled, allows pausing and playing of the animated renders.

Figure 7:
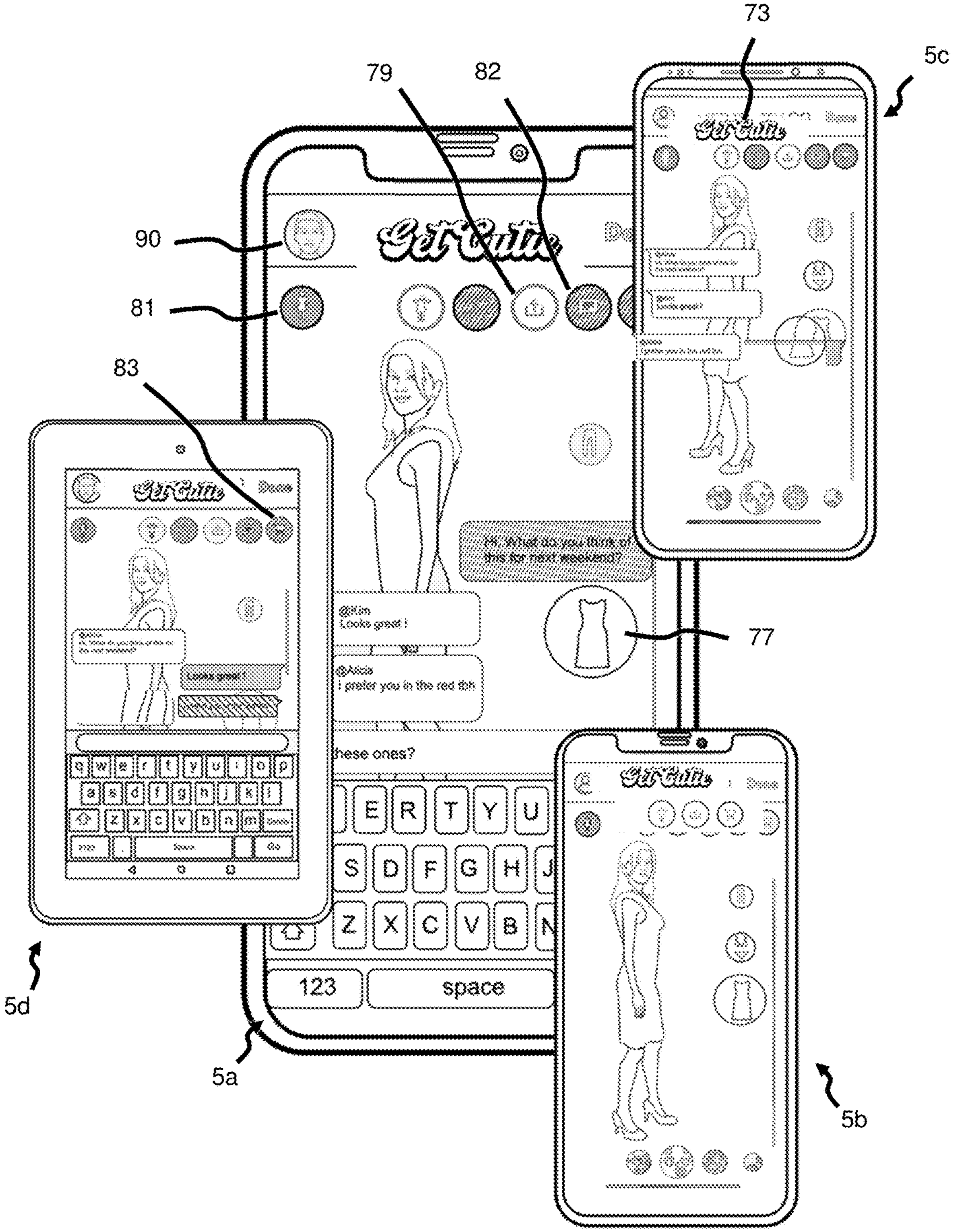

The user interface 70 also includes other UI elements, such as a body model UI element 78 for changing how the model appears (e.g., height, skin tone, clothing size etc), a sharing UI element 79 (to share a link to invite others to that users virtual fitting room), a messaging UI element 82 (to chat between the host and invited visitors, show as text chats but may be voice and/or video—see FIG. 7), and a user profile UI element 90 (to manage a user profile, consents for use of features, or register).

The request that is initiated by a user device 5, 6 and sent to the virtual server 4 also includes with the request a user session identifier. This facilitates routing of the response to the request to the correct user device 5, 6.

Additionally, the user session identifier can be used to control which body model is used by the virtual model server 4 when generating animated composite models 45.

Alternatively, an environment identifier may be used to identify a virtual environment that contains a previously generated composite model. This allows the user to pick up where they left off.

In this case, the virtual model server stores the environment identifier which references the most recent content of the virtual environment and, in particular, the appearance of a virtual subject within that environment. A user can thus conveniently retrieve a virtual subject that was previously specified, even if this occurred in a previous data exchange between the user device and the virtual model server. Such previous sessions may be listed in their user profile under activities, showing when a user has performed certain functions within the systems, such as being nearby a retailer physical store, processing a face image, or inviting others to the virtual fitting room.

At least part of the environment identifier, or the user session identifier may be stored as an arbitrary authentication token within a local storage area of a user device—for example, within the local storage area of a browser.

Accordingly, a user session identifier or an environment identifier can be used by the virtual model server 4 to identify if a user has previously established a preferred body model, linked to that user session identifier or environment identifier.

To this end, the user interface 70 comprises a body model customisation module that allows a user to select or specify various characteristics of a body model—typically reflecting real-world characteristics of the user themselves. For example, the body model customisation module allows a user to select hair-style, model gender (including genderless), height, weight, skin tone, clothing sizes (e.g. chest size, collar size, waist size, inside leg measurement) among others. These can be stored, where appropriate, as attributes of a body model 41. As described above, these attributes reflect real-world conditions and behaviour and so entering this information allows for the accurate virtual fitting of clothes represented by a clothing model 42, to a virtual subject defined by a body model 41. In addition to information that customises the appearance of the body model, a user may specify other customisations. For example, the user may specify preferred motions to be enacted by the body model, and so the body model, and resulting composite models, may be associated with user-specified motion descriptors.

The body model customisation module may be configured to receive the characteristics of a body model via different ways. For example, information may be selected from a menu by a user, such as a gesture driven menu, the user may enter values of certain parameters, and/or the characteristics may be automatically determined from an automatic determination system or process, and/or imported from such a system or process.

The automatic determination system or process may comprise a body scanner. The body scanner may allow a user to present themselves such that appropriate characteristics can be measured. The automatic determination system or process may be provided as part of a system according to the present embodiment, or may be obtained from one or more third-party providers who may specialise in such measurements as an input to the system.

Figure 6:
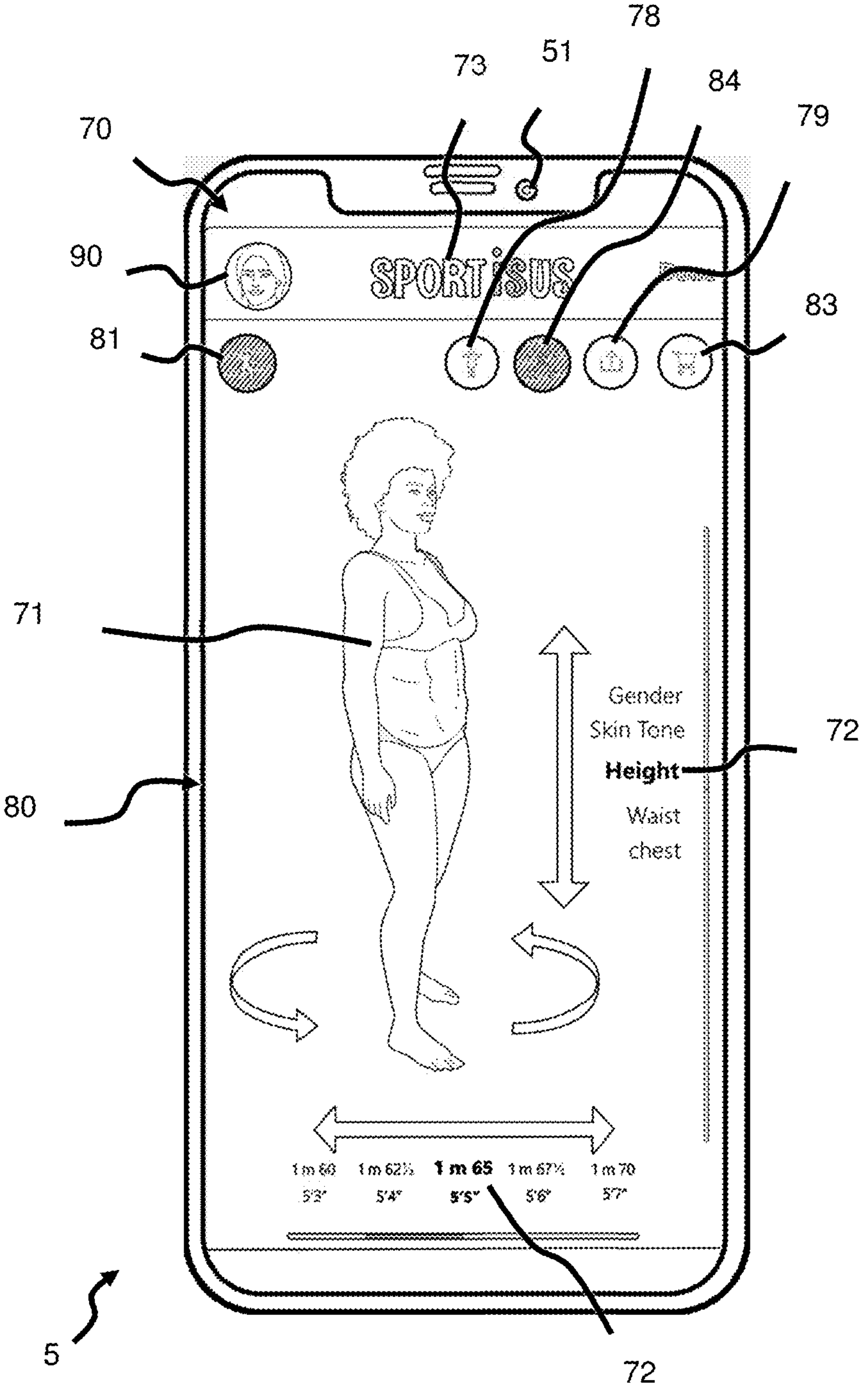

An example of a body model customisation module 80 is shown in FIG. 6. The body model customisation module 80 comprises a model display region 71 and control region 72 as before, but has attribute selection and adjustment UI elements via which the characteristics of the body model can be customised.

In this specific example, a vertically-scrolling menu displayed on the right of the render allows selection of attributes, and a horizontally-scrolling menu display below the render allows the values of those attributes to be changed. Thus, using vertical and horizontal swiping actions, a user can quickly customise a body model, and view the resulting render of a virtual subject according to that body model.

The user interface 70 comprises a body model UI element 78 that, when selected, causes the user interface 70 to provide the user with the body model customisation module 80 as shown in FIG. 6.

Additionally, the body customisation module 80 comprises a face upload UI element 84 which, when selected, allows an image of the face of a user to be applied to the body model. Selecting the face upload UI element 84 enables the front camera 51 to let a user capture an image of their face, or otherwise opens an image selection dialogue via which a pre-captured or alternate image can be selected. The face image can be transmitted to the virtual model server to be processed—for example to accurately map the features of the face image to facilitate the application of such image to various animated body models or composite models. Alternately, in certain embodiments, the processing may be carried out on the user device 5, 6. Regardless, the body customisation module allows adaptation of the customised body model (and/or the customised composite model) so that the models face materially matches that of the face image.

Essentially, a user may upload a face image that may be consented for processing and for use with body models. The animated composite models may be pre-processed to ascertain where the facial features are within each animated render. The system can then apply the face to the render knowing both the source facial features and the movement of the target face within the render. This helps the animated body composite model 'look like' the user and provides a further level of personalisation and customisation.

The face upload UI element 84 may also be provided in other modules or screens.

Selecting the body model UI element 78 from within the body model customisation module 80 ends body model customisation, allowing the user to use that customised body model during a clothing selection and display session.

A customised body model is typically stored at the virtual model server 4, and so can be retrieved again during another user visit to the same retail environment, or even during a visit to a different retail environment. This avoids the need for the user to have to repeat body customisation. The user may also have different body models for different retailers, such as may be an aspirational body size for holiday wear or target body model size following a weight loss programme, or similar.

This can be implemented in a variety of ways, such as an authentication token being available on the user device. This is checked and either used to generate a user session identifier which (through an authenticated users profile) specifies the correct model to use, and/or itself specifies the model to use such as a default model. Alternatively, a user can establish a user account with the virtual model server, and the customised body model, and other personalised or customised data can be stored within that account. Alternatively, an environment identifier can be used to specify a virtual environment within which a previously customised virtual subject is stored.

The user account can be established within the app shown in FIGS. 4 to 7 by selecting the user account UI element 90 which then prompts the user to either register a new profile, or to authenticate to an existing profile. To access an existing profile, the user typically provides access credentials—for example, providing a username and password, or via biometric recognition, typically using social and shopping platforms authentication services. Doing so modifies the user session identifier to correspond to the established user account, and so identifies to the virtual model server 4 which body model 41 to use.

This is in contrast with a guest or anonymous visit to a retail environment, such as if a user did not have a profile, or the user had a profile but was not authenticated (or had logged out): the user session identifier in this case is typically not registered against any particular user account, and so a default or random model may be selected as may be agreed with the retailer for various clothing items. Nonetheless, a body model can be selected depending on clothing chosen via the retail environment—for example a male model being chosen in response to the selection of men's clothing, or a female model being chosen in response to the selection of women's clothing. Additionally, an environment identifier can be provided to use an alternative default body model, yet still not customisable by the guest user, such as to allow a retailer to customise by certain demographic of user allowing some level of personalisation by the retailer.

The arrangement of the system 1, whereby a virtual model server 4 confers to multiple retailer servers 3 the ability to show their customers (i.e. users) how clothing options look when applied to a user-customised body model is particularly advantageous. The virtual model server 4 acts as a central repository for user data, including customised body models, relieving the retailer server of the burden of acquiring such data, and relieving the user of the burden to establish customisations for each individual visit.

Additionally, potentially sensitive personal data is kept separate from all and any retailer systems. Furthermore, a user profile can include a selfie of the user—i.e., an image of the user's face—uploaded by the user to the virtual model server for the purpose of personalising the appearance of their customised body model. To this end the body customisation module is arranged to receive the face image and adapt the customised body model so that its face matches that of the user as described. Neither the face image nor other user details are provided to the retailer. The retailer is only provided differently customised content in the form of renders.

The system 1 is further configured to allow multiple users to share a common experience, via their respective user devices, of virtual subjects wearing clothing and animated in accordance with one or more of those user's preferences. Thus, the system supports a shared display environment. This is typically implemented across the virtual model server and two or more user devices. In particular, the user interfaces of the two or more user devices and the virtual model server 4 communicate with one another to display a common virtual subject simultaneously. Access to the virtual environment can be controlled via the sharing of an environment identifier.

For example, each user via their respective user device, can send requests via individual retailer servers to the virtual model server 4 and, in response, can view customised virtual animated subjects modelling a selection of garments chosen by the user, these being shared with other users in real-time. Renders requested by one user can be shared with other users. This is typically achieved by the virtual model server receiving a sharing request from one user device, and in response transmitting user interface data to at least one other user device to enable display of renders on at least two user devices simultaneously.

Moreover, the system 1 enables the sharing of control over a virtual subject. Accordingly, two or more users are provided with control over the customisation of a single virtual subject.

Specifically, the shared display environment is configured to receive a control input from any one of multiple user devices. For example, a control input can be received by the virtual model server, and this can be used to send a user interface data update to the user devices that are taking part in the shared display. In response, the render displayed by those devices are updated in concert.

Furthermore, multiple renders may be displayed simultaneously side-by-side, for example with each virtual subject representing an individual user.

Thus, the system can support an interactive virtual (e.g. fitting room) environment where multiple users can view one another's virtual subjects, and make suggestions for the customisation of their appearance and clothing. In particular, users in a shared environment can communicate with one another—for example by sending messages to one another, and these can be displayed together with the renders.

Specifically, the virtual model server receives a sharing request, and generates at least one sharing link to a shared display environment such as a virtual changing room. A sharing link, when followed by a user device, enables the participation of that user device in the shared display environment. The virtual model server 4 sends a common set of user interface data to multiple user devices, and so enables the display of a common set of renders on those user devices while other user interface data (and capability) is related to the user mode that use has. Additionally, the virtual model server receives requests from multiple user devices for the customisation of one or more virtual subjects displayed by the set of renders, and in response generates a corresponding set of composite models for use in sending out a further common set of user interface data.

In certain embodiments, the interactive nature of the shared fitting room features and the chat communication feature is handled using websockets, such as Signal R. The 'host authenticated user' is the owner of the session and has the ability to make changes to the body model, clothing model, motion descriptor or other. There is capability in the system to allow users with other user modes to also make changes to the style and colours (for example) in a virtual fitting room, such as may be used by a brand fashion consultant or other where the user and brand consultant may both be interacting. The websockets maintain a connection between the clients and the server with the remote clients subscribing to a central fitting room referencing an environment identifier. If, for example, the host changes a parameter such as the colour of clothing, then the host initiated this change from their user device, this updates the virtual model server session colour parameter for that virtual environment session, and the websockets on seeing such a change will send other subscribed devices an event. Such an event may be a message to download the new selection of composite body model (e.g. in a different colour) or other assets to display on the visitor user devices, or may contain the messages from users using the chat feature. The use of websockets to implement an instance of the fitting room virtual environment, allows for the scalable and real-time dynamic sharing of the virtual fitting room environment. Changes of styles, colours, movements, and other characteristics of the virtual subject, and of the wider shared virtual environment, initiated by one user—typically at a host user device—are near-instantaneously updated on other visitor user devices.

In summary, a host user's interaction within a retailer service, as provided by the retailer server, will cause a virtual environment (i.e. fitting room) to be initiated with unique environment identifier. This allows authorised consented host users to share a unique invite to that virtual environment with other visitor users. Additionally, different authorisation groups may be set to allow different levels of access to the virtual environment such as previously described:

The use of websockets, for example, allows a scalable implementation of this embodiment that can update multiple remote users, for multiple virtual environments concurrently in near real-time.

In the embodiments shown in FIGS. 4 to 7, a sharing request is initiated by selecting the sharing UI element 79.

An example of multiple users sharing a common experience is shown in FIG. 7 in which four user devices 5*a*, 5*b*, 5*c*, 5*d* are shown, each under the control of a different user. A first of the user devices 5*a* belong to a first user whose customised body model is displayed. The user interface provides a sharing UI element 79 which, when selected, provides the user with an option to generate a sharing link to be shared with a guest (i.e. not logged-in) user, denoted by the second user device 5*b*, and another two logged in users denoted by the third user device 5*c* and the fourth user device 5*d*. Accordingly, the shared display environment allows the user interface of the first, second and third user devices 5*a*, 5*b*, 5*c*, 5*d* to view the same virtual subject.

Additionally, the shared display environment provides a messaging function with messages being transmitted between users, and can be displayed like a temporary overlay to the underlying render with the ability to hide or show such comments. In the embodiments shown in FIGS. 4 to 7, this is accessed via the selection of the messaging UI element 82.

Messaging is exemplified schematically in FIG. 7 by comparing the first, third and fourth user devices 5*a*, 5*c*, 5*d*.

Guest users (i.e. using device 5*b*) are typically restricted in their interaction with the sharing host user, under permissions established by the system or the host user, and thus whilst they can see the shared render, they may not be able to alter it, or send messages to the sharing user without first becoming a registered and authenticated user.

The third user device 5*c* has additional permissions to both view the shared render, and also receive/view chat message, but not the ability to send messages within that virtual environment.

The fourth user device 5*d* has had further additional permissions to view the shared render, and also to send and receive messages, allowing a multi-way chat between the fourth user and the first, host user to be conducted. Ideally, the shared virtual environment hosted by 5*a* is accessible by one or more concurrent 5*b* 5*c* and or 5*d* users, ideally up to a maximum number defined within a system-only changeable parameter within the host user profile.

Thus an exemplary set of embodiments have been described in relation to the system for the display of virtual clothing.

Although the invention has been described in conjunction with specific embodiments thereof, it is evident that many alternatives, modifications and variations will be apparent to those skilled in the art. Accordingly, it is intended to embrace all such alternatives, modifications and variations.

The invention claimed is:

1. A computer-implemented clothing retail system for the display of virtual clothing worn by virtual body models on a user interface of a user device, the system comprising the user device and a virtual model server, the system configured to:

receive, by the virtual model server, a display request for displaying on the user device virtual clothing worn by a virtual body model, the request including a reference to a set of clothing models, and a user session identifier that specifies the user device;

generate, by the virtual model server, a set of animated composite models, each including:

a body model;

one of the referenced set of clothing models; and a motion descriptor;

register, by the virtual model server, a plurality of renders of the animated composite models, each render of the plurality of renders comprising a sequence of a plurality of frames, each frame registered with a view and/or pose of the set of animated composite models;

transmit, by the virtual model server to the user device specified by the user session identifier, in response to the display request, user interface data that causes the user interface on the user device to:

display a first render of the plurality of renders relative to a first animated composite model, the first render having a first sequence of a plurality of frames, depicting a dynamic virtual subject defined by the body model wearing a clothing model referenced by the display request, and moving within a range of motion defined by a selected motion descriptor; and receive a switching user interaction via the user interface to switch from the first render to a second render of the plurality of renders, the second render having a second sequence of a plurality of frames, wherein in response to receiving the switching user interaction the user device receives the second render from the virtual model server that responsively minimizes display continuity by:

determining a frame of the first sequence of the first render at the time the switching interaction is received;

determining a match between a view and/or pose of a frame of the second sequence of the second render and the view and/or pose of the frame of the first render; and, causing the displayed first render to switch to the second render based on the matched frame of the second render by displaying the sequence of frames of the second render starting with a next frame while retaining the motion defined by the selected motion descriptor;

wherein the user interface of the user device comprises a model display region within which renders of virtual subjects are displayed, and a control region via which a user can provide control inputs to the user interface, the control region comprising a user interface element for receiving the switching user interaction.

2. The system of claim 1, wherein the set of animated composite models each comprise at least one of a common body model and a common motion descriptor.

3. The system of claim 1, wherein the generation of the set of animated composite models comprises performing a virtual fitting of clothes represented by set of clothing models, to a virtual subject defined by the body model.

4. The system of claim 1, wherein at least one of the body model and the set of clothing models comprise attributes that reflect real-world conditions and behaviour of those models, the attributes including at least one of size and elasticity.

5. The system of claim 1, further comprising at least one retailer server configured to provide an electronic commerce retail environment via which a set of clothes can be selected for viewing by user, via a respective user device, user selection of the set of clothes within the electronic commerce retail environment controlling generation of the display request that is sent to the virtual model server, with the reference to a set of clothing models corresponding to the set of user-selected clothes.

6. The system of claim 5, the retail environment further comprising a clothing ordering interface configured to receive a user order to purchase clothing associated with at least one of the set of clothes displayed.

7. The system of claim 1, wherein receiving the switching user interaction comprises receiving at least one of user command to change at least one of the size, fabric and style of clothing to be displayed.

8. The system of claim 1, wherein the body model that is used to generate the set of animated composite models is dependent on the user session identifier.

9. The system of claim 1, wherein the virtual model server comprises a plurality of user accounts each having a customised body model associated with it, access to a user account being dependent on a user providing valid access credentials.

10. The system of claim 9, wherein each user account has a unique user session identifier associated with it, the unique user session identifier being provided to the virtual model server as part of a display request originating from a user authorised via access credentials, to access their user account.

11. The system of claim 9, wherein the user interface comprises a body customisation module via which the customised body model can be specified, the body customisation module comprising UI elements for selecting or adjusting the characteristics of the body model, including at least one of height, body clothing size, and/or skin tone.

12. The system of claim 11, wherein the UI elements comprise at least one menu for selecting attributes of the body model, and for changing the values of those attributes.

13. The system of claim 11, wherein the body customisation module is arranged to receive an image of the face of a user and adapt the customised body model and associated renders so that its face materially matches that of the user.

14. The system of claim 1 further comprising a shared display environment in which the virtual model server receives a sharing request and in response transmits at least part of the user interface data to at least one other user device to enable display of renders of the same composite model on at least two user devices simultaneously.

15. The system of claim 14, wherein the shared display environment is configured to receive a control input from any of the at least two user devices and in response change the render displayed by those at least two user devices.

16. The system of claim 14, wherein the shared display environment is configured with a messaging interface via which messages can be transmitted between the at least two user devices.

17. The system of claim 16, wherein the messages are displayed together with renders.

18. The system of claim 14, wherein the multiple renders are displayed simultaneously as part of the shared display environment.

19. The system of claim 1, wherein the user interface of the user device is configured to display multiple renders simultaneously.

20. A virtual clothing display method associated with a user interface of a user device, comprising:
- receiving, by a virtual model server, a display request for displaying virtual clothing worn by a virtual body model, the request including a reference to a set of clothing models generating a set of animated composite models, each including:
  - a body model;
  - one of the referenced set of clothing models; and
  - a motion descriptor;
- registering, by the virtual model server, a plurality of renders of the animated composite models, each render of the plurality of renders comprising a sequence of a plurality of frames, each frame registered with a view and/or pose of the set of animated composite models;
- transmitting, by the virtual model server, in response to the display request, user interface data that causes the user interface on the user device to:
  - display a first render of the plurality of renders relative to a first animated composite model, the first render having a first sequence of a plurality of frames, depicting a dynamic virtual subject defined by the body model wearing a clothing model referenced by the display request, and moving within a range of motion defined by a selected motion descriptor; and
  - receive a user interaction via the user interface to switch from the first render to a second render of the plurality of renders, the second render having a second sequence of a plurality of frames, wherein in response to receiving the switching user interaction the user device receives the render from the virtual model server that responsively minimizes continuity by:
    - determining a frame of the first sequence of the first render at the time the switching interaction is received;
    - determining a match between a view and/or pose of a frame of the second sequence of the second render and the view and/or pose of the frame of the first render; and,
    - causing the displayed first render to switch to the second render based on the matched frame of the second render by displaying the sequence of frames of the second render starting with a next frame while retaining the motion defined by the selected motion descriptor;
- wherein the user interface of the user device comprises a model display region within which renders of virtual subjects are displayed, and a control region via which a user can provide control inputs to the user interface, the control region comprising a user interface element for receiving the switching user interaction.

21. A non-transitory computer readable storage medium comprising instructions which, when executed on at least one of a virtual model server, a retailer server, and a user device, configures the at least one virtual model server, retailer server, and user device to perform a virtual clothing display operation on a user interface on the user device, comprising:
- receiving, by the at least one virtual model server, a display request for displaying virtual clothing worn by a virtual body model, the request including a reference to a set of clothing models;
- generating, by the at least one virtual model server, a set of animated composite models, each including:
  - a body model;
  - one of the referenced set of clothing models; and
  - a motion descriptor;
- registering, by the at least one virtual model server, a plurality of renders of the animated composite models, each render of the plurality of renders comprising a sequence of a plurality of frames, each frame registered with a view and/or pose of the animated composite model;
- transmitting, by the at least one virtual model server, in response to the display request, user interface data that causes-the user interface on the user device to:

display a first render of the plurality of renders relative to a first animated composite model, the first render having a first sequence of a plurality of frames, depicting a dynamic virtual subject defined by the body model wearing a clothing model referenced by the display request, and moving within a range of motion defined by a selected motion descriptor; and receive a user interaction via the user interface to switch from the first render to a second render of the plurality of renders, the second render having a second sequence of a plurality of frames, wherein in response to receiving the switching user interaction the user device receives the render from the virtual model server that responsively minimizes continuity by:

determining a frame of the first sequence of the first render at the time the switching interaction is received;

determining a match between a view and/or pose of a frame of the second sequence of the second render and the view and/or pose of the frame of the first render; and, causing the displayed first render to switch to the second render based on the matched frame of the second render by displaying the sequence of frames of the second render starting with a next frame while retaining the motion defined by the selected motion descriptor;

wherein the user interface of the user device comprises a model display region within which renders of virtual subjects are displayed, and a control region via which a user can provide control inputs to the user interface, the control region comprising a user interface element for receiving the switching user interaction.

* * * * *